США010128906B2

United States Patent
Olmstead

(10) Patent No.: US 10,128,906 B2
(45) Date of Patent: Nov. 13, 2018

(54) POWER LINE SIGNAL COUPLER

(71) Applicant: Esker Technologies, LLC, Mequon, WI (US)

(72) Inventor: Brian S. Olmstead, Bayside, WI (US)

(73) Assignee: Esker Technologies, LLC, Mequon, WI (US)

( * ) Notice: Subject to any disclaimer, the term of this patent is extended or adjusted under 35 U.S.C. 154(b) by 0 days.

(21) Appl. No.: 15/646,266

(22) Filed: Jul. 11, 2017

(65) Prior Publication Data

US 2018/0013468 A1    Jan. 11, 2018

Related U.S. Application Data

(60) Provisional application No. 62/360,785, filed on Jul. 11, 2016.

(51) Int. Cl.
*H04B 3/56* (2006.01)
*H04B 3/54* (2006.01)

(52) U.S. Cl.
CPC .............. *H04B 3/56* (2013.01); *H04B 3/548* (2013.01); *H04B 2203/5425* (2013.01); *H04B 2203/5487* (2013.01); *H04B 2203/5491* (2013.01)

(58) Field of Classification Search
CPC .. H04B 3/56; H04B 3/548; H04B 2203/5425; H04B 2203/5487; H01M 10/46; H01M 10/48
USPC ..... 340/455, 538, 538.12, 635, 636.11, 657; 307/150; 317/61.5
See application file for complete search history.

(56) References Cited

U.S. PATENT DOCUMENTS

| 2,990,482 | A | * | 6/1961 | Morris | .................. | B06B 1/0618 |
| | | | | | | 310/318 |
| 2,996,652 | A | * | 8/1961 | Cassell | ..................... | H02J 7/12 |
| | | | | | | 320/165 |
| 3,139,585 | A | * | 6/1964 | Ross | ........................ | H03K 3/55 |
| | | | | | | 327/178 |
| 3,678,341 | A | * | 7/1972 | Constable | .............. | H02H 9/001 |
| | | | | | | 336/175 |

(Continued)

FOREIGN PATENT DOCUMENTS

| EP | 0659613 | 5/1995 |
| EP | 1383280 | 1/2004 |

(Continued)

OTHER PUBLICATIONS

Office Action dated Aug. 29, 2006 regarding U.S. Appl. No. 11/227,376, 10 pages.

(Continued)

*Primary Examiner* — Hung T Nguyen
(74) *Attorney, Agent, or Firm* — Ryan Kromholz & Manion, S.C.

(57) ABSTRACT

A main power line (+ and − lines) is coupled to a power supply, for example a car battery, grounded to a vehicle chassis. Positive and negative main power lines are coupled to a power line gateway module, and spliced to carry power for a segment, until receiving, by splices, RF power line communcations. The main power lines, now carrying power and RF power line communications are then coupled to remote modules. RF power line communication carries signal from the power line gateway module to a impedance matching network or a transformer are used to match impedances.

4 Claims, 1 Drawing Sheet

(56) References Cited

U.S. PATENT DOCUMENTS

| | | | |
|---|---|---|---|
| 4,523,307 A | 6/1985 | Brown et al. | |
| 4,639,609 A | 1/1987 | Floyd et al. | |
| 4,749,992 A | 6/1988 | Fitzemeyer et al. | |
| 4,823,383 A | 4/1989 | Cardot et al. | |
| 5,040,168 A | 8/1991 | Maue et al. | |
| 5,142,278 A * | 8/1992 | Moallemi | B61L 15/0036 307/10.1 |
| 5,148,144 A | 9/1992 | Sutterlin et al. | |
| 5,353,189 A | 10/1994 | Tomlinson | |
| 5,488,352 A | 1/1996 | Jasper | |
| 5,694,109 A | 12/1997 | Nguyen | |
| 5,727,025 A | 3/1998 | Maryanka | |
| 5,739,592 A | 4/1998 | Rigsby et al. | |
| 5,745,027 A | 4/1998 | Malville | |
| 5,812,557 A | 9/1998 | Stewart et al. | |
| 5,870,016 A | 2/1999 | Shrestha | |
| 5,900,803 A | 5/1999 | Politz et al. | |
| 6,006,143 A | 12/1999 | Bartel et al. | |
| 6,127,939 A | 10/2000 | Lesesky et al. | |
| 6,137,880 A | 10/2000 | Bella | |
| 6,167,121 A | 12/2000 | Arai | |
| 6,229,432 B1 | 5/2001 | Fridley et al. | |
| 6,229,434 B1 | 5/2001 | Knapp et al. | |
| 6,356,426 B1 | 3/2002 | Dougherty | |
| 6,373,377 B1 | 4/2002 | Sacca et al. | |
| 6,392,368 B1 | 5/2002 | Deller et al. | |
| 6,393,064 B1 | 5/2002 | Nagai et al. | |
| 6,400,103 B1 | 6/2002 | Adamson | |
| 6,411,203 B1 | 6/2002 | Lesesky et al. | |
| 6,418,221 B1 | 7/2002 | Snow et al. | |
| 6,434,459 B2 | 8/2002 | Wong et al. | |
| 6,453,687 B2 | 9/2002 | Sharood et al. | |
| 6,507,158 B1 | 1/2003 | Wang | |
| 6,512,307 B1 | 1/2003 | Ilg | |
| 6,608,554 B2 | 8/2003 | Lesesky et al. | |
| 6,629,032 B2 | 9/2003 | Akiyama | |
| 6,731,201 B1 | 5/2004 | Bailey et al. | |
| 6,744,352 B2 | 6/2004 | Lesesky et al. | |
| 6,759,946 B2 | 7/2004 | Sahinoglu et al. | |
| 6,771,774 B1 | 8/2004 | Phan et al. | |
| 6,799,814 B2 | 10/2004 | Lesesky et al. | |
| 6,800,957 B2 | 10/2004 | Nerone et al. | |
| 6,842,108 B2 | 1/2005 | Akiyama et al. | |
| 6,842,668 B2 | 1/2005 | Carson et al. | |
| 6,853,724 B2 | 2/2005 | Wang | |
| 6,895,089 B2 | 5/2005 | Wang | |
| 6,933,752 B2 | 8/2005 | Dreps | |
| 6,970,772 B2 | 11/2005 | Radtke et al. | |
| 7,010,050 B2 | 3/2006 | Maryanka | |
| 7,042,339 B2 | 5/2006 | Bruccoleri et al. | |
| 7,117,272 B2 | 10/2006 | Rimboim | |
| 7,245,201 B1 * | 7/2007 | Kline | H04B 3/542 340/12.32 |
| 7,286,044 B2 | 10/2007 | Yanagida et al. | |
| 7,307,520 B2 | 12/2007 | Lamon et al. | |
| 7,545,178 B2 | 6/2009 | Hung | |
| 7,741,960 B1 | 6/2010 | Hoogenakker et al. | |
| 7,752,472 B2 | 7/2010 | Diab | |
| 7,852,206 B2 | 12/2010 | Yanagida et al. | |
| 7,859,397 B2 | 12/2010 | Lamon et al. | |
| 7,921,308 B2 | 4/2011 | Dhuyvetter | |
| 8,154,150 B2 | 4/2012 | Sakai | |
| 8,154,153 B2 | 4/2012 | Yang et al. | |
| 8,179,655 B2 | 5/2012 | Wedley | |
| 8,442,127 B2 | 5/2013 | Stadelmeier et al. | |
| 8,527,135 B2 | 9/2013 | Lowrey et al. | |
| 8,541,903 B2 | 9/2013 | Burk | |
| 8,594,314 B2 | 11/2013 | Kitchin et al. | |
| 8,638,216 B2 | 1/2014 | Lamon et al. | |
| 8,693,151 B2 | 4/2014 | Iwasa et al. | |
| 9,515,747 B2 | 12/2016 | Soto et al. | |
| 9,537,644 B2 | 1/2017 | Jones | |
| 9,779,720 B2 | 10/2017 | Lee | |
| 9,787,362 B2 | 10/2017 | Varadarajan | |
| 2002/0079121 A1 * | 6/2002 | Ryan | C09D 167/00 174/68.1 |
| 2003/0076221 A1 | 4/2003 | Akiyama et al. | |
| 2004/0258141 A1 | 12/2004 | Tustison | |
| 2008/0013637 A1 | 1/2008 | Kodama | |
| 2009/0134718 A1 * | 5/2009 | Hurst | H01M 2/206 307/150 |
| 2010/0061545 A1 | 3/2010 | Kitchin et al. | |
| 2011/0279935 A1 | 11/2011 | Iwasa | |
| 2012/0177133 A1 | 7/2012 | Oldenkamp | |
| 2013/0223293 A1 | 8/2013 | Jones | |
| 2014/0265551 A1 | 9/2014 | Willis | |
| 2015/0065039 A1 | 3/2015 | Nii | |
| 2016/0351327 A1 | 12/2016 | Shigematsu | |
| 2017/0040968 A1 | 2/2017 | Igarashi | |
| 2017/0093230 A1 | 3/2017 | Yundt | |
| 2017/0310306 A1 * | 10/2017 | Tanghe | H03H 11/30 |

FOREIGN PATENT DOCUMENTS

| | | |
|---|---|---|
| JP | 02005123960 | 5/2005 |
| WO | WO02/052745 | 7/2002 |
| WO | WO2004/055994 | 7/2004 |

OTHER PUBLICATIONS

Office Action dated May 8, 2007 regarding U.S. Appl. No. 11/227,376, 8 pages.
Office Action dated Feb. 18, 2010 regarding U.S. Appl. No. 12/001,123, 7 pages.
Office Action dated Oct. 18, 2017 regarding U.S. Appl. No. 15/287,470, 10 pages.
Joe Klinger, Phone Line Basics: Revisited, Mar. 2002, Radio Guide Magazine, accessed from www.jkaudio.com/article_10.htm on Oct. 10, 2017.

* cited by examiner

POWER LINE SIGNAL COUPLER

RELATED APPLICATION

This application claims the benefit of co-pending U.S. Provisional Patent Application Ser. No. 62/360,785, filed 11 Jul. 2016.

BACKGROUND OF THE INVENTION

In electrical communications, as with any communications generally, clarity is key. Clarity may be difficult to achieve in a variety of environments in which clear communications are critical. For instance, communications at radio frequencies over direct current (DC) power busses is known. In some instances, however, reliability of such communications is interrupted by environmental noise and/or voltage spikes occurring on the power bus. Accordingly, the art of communications over or along a DC power bus may be enhanced by better filtering techniques.

Inductors are placed in power lines to add impedance to the lines. In this manner, RF signal can be carried by the lines.

SUMMARY OF THE INVENTION

A filter provides enhanced filtering of transient and spurious signals which may otherwise interfere with a communication signal. Such filter may be advantageously used in wired, noisy communication environments, such as communication environments provided on vehicles (e.g., automobiles, airplanes, boats, locomotives).

Systems of the present invention can inject a signal onto a power line a distance from ground. Inductance of a segment of wire is used in place of a discrete inductor.

A main power line (+ and – lines) is coupled to a power supply, for example a car battery, grounded to a vehicle chassis. Positive and negative main power lines are coupled to a power line gateway module, and spliced to carry power for a segment, until receiving, by splices, RF power line communications. The main power lines, now carrying power and RF power line communications are then coupled to remote modules. RF power line communication carries signal from the power line gateway module to a impedance matching network or a transformer are used to match impedances.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
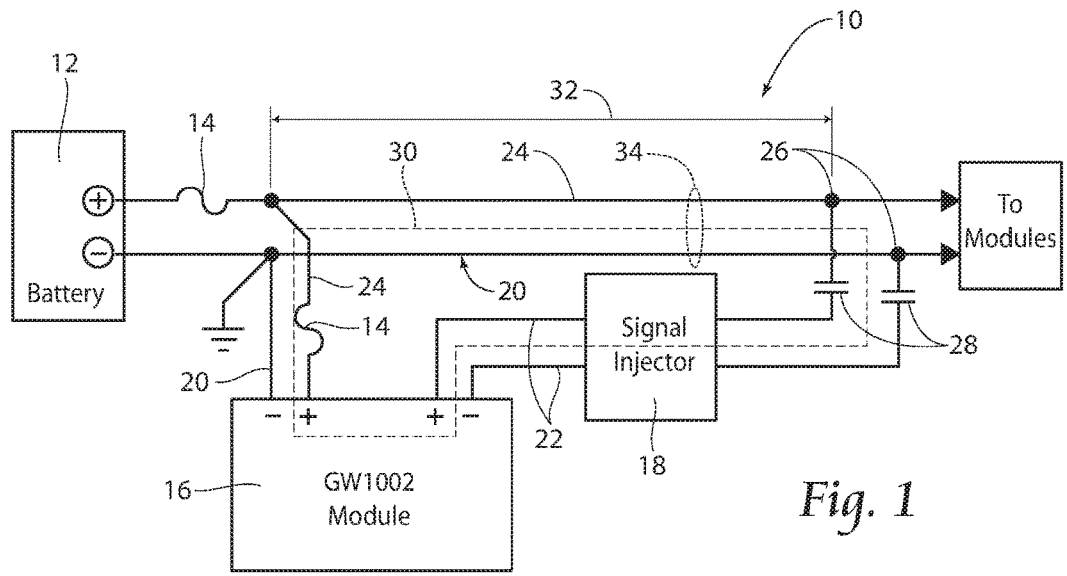
FIG. 1 is a schematic view of circuitry of the present invention.

Referring now to FIG. 1, a schematic view of circuitry of the present invention is shown. A battery 12 (for example a car battery, grounded to a vehicle chassis) carries a main power line (+ and – lines 24 and 20, respectively). An optional fuse 14 is provided on the positive line. Coming from the main positive and negative power lines 24 and 20, power lines 24 and 20 are spliced and coupled to module 16, or power line gateway module GW1002 to power the module. RF power line communication signals are provided by module 16, and carried by lines 22 from the module to impedance matching network (for impedance transformation) capacitor network 18 (discussed in FIG. 2 or 3). After impedance matching network 18, lines 22 go through optional fuse, capacitor or other form of wire protection 28, and are spliced with main positive and negative power lines 24 and 20 at splices 26. Splices 26 can comprise, for example, Scotchlok™ connectors by The 3M Company. Following the splices 26, the power lines 24 and 20, now carrying DC power (from battery 12) and RF communications (from module 16 GW1002), carry the DC power and RF communications downstream to a module or bank of modules (not shown) to power and control the modules. Splices off of main power lines 24 and 20 can be made to each module until power lines 24 and 20 terminate.

Still referring to FIG. 1, a desired length 32 of power wires 24 and 20 is preferred between the battery 12 and splices 26. In an exemplary embodiment operating at 4.5 MHz frequency, if length 32 was too short, communications issues could arise as length 32 would not provide enough effective inductance. As the length 32 of the conductor (power wires 24 and 20) increases, so too does the inductance. In a preferred embodiment, a roughly 1 µH (microhenry) inductance is desired in a system at impedance of 40 ohms (Ω), and resistance of 120 ohms. To achieve the desired inductance, the length and diameter of the power wires 24 and 20 can be changed to target the roughly 1 µH level of inductance. In an exemplary embodiment at 4.5 MHz frequency, for #8 wire, a length 32 of the conductor (power wires 24 and 20) is approximately 4' to achieve the desired self inductance of length 32 of the conductor (power wires 24 and 20). It is preferred to provide length 32 of the conductor (power wires 24 and 20) long enough to provide a high enough impedance.

Figure 2:
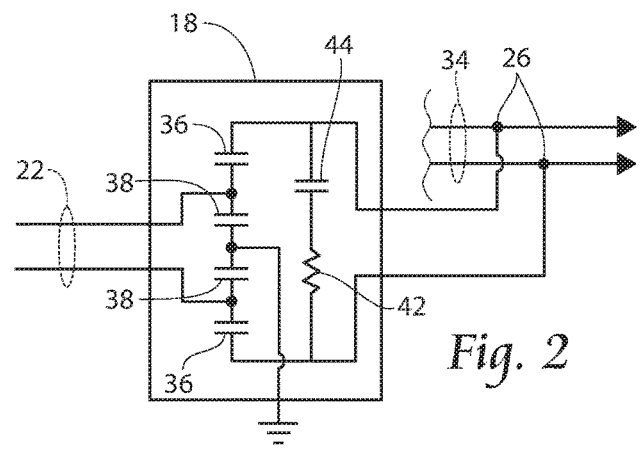
FIG. 2 is a detail schematic view of the impedance matching network for impedance transformation of the present invention.

FIG. 2 is a detail schematic view of the impedance matching network 18 for impedance transformation used in the present invention. Wires 22 enter impedance matching network 18 from module 16, into preferably a circuit board with matching capacitors 36 and 38. In an exemplary embodiment, a 12 nF (nanofarad) capacitor 36 is matched with a 2.7 nF capacitor 38 in a first pair (upper in FIG. 2), and another 12 nF capacitor 36 is matched with a 2.7 nF capacitor 38 in a second pair (lower in FIG. 2). Between 2.7 nF capacitors 38, the unit can be center tapped to ground. Optionally, a capacitor 44/resistor 42 series can be provided to reduce a Q Factor. In this context, Q Factor is the bandwidth of the circuit, defined by the reactance of the circuit), and in this application, a lower Q Factor is desired to allow for wide tuning. In an alternate embodiment (not shown), a capacitor 44/resistor 42 series could be provided in module 16 instead of impedance matching network 18. Signal comes out of impedance matching network 18 with communication signals, 180 out of phase, through a matching network through lines 22 running in parallel with lines 24/20, to which lines 22 are spliced at splices 26.

Figure 3:
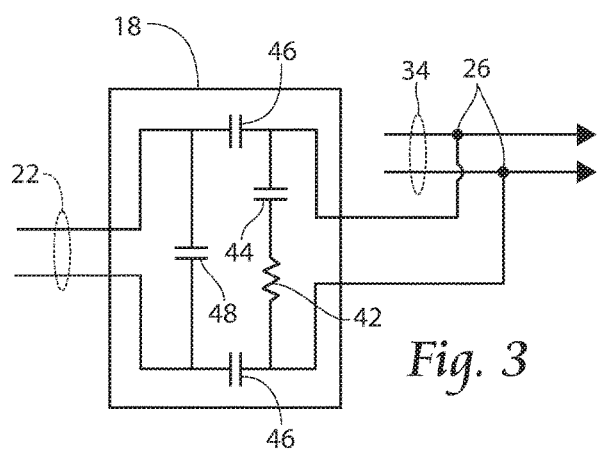
FIG. 3 is a power line coupler of the present invention.

Referring now to FIG. 3, an alternative capacitor arrangement of impedance matching network 18 is shown, with lines 22 entering into the system, and in an exemplary arrangement a first capacitor 48 (1.3 nF for example) is followed by pair of second capacitors 46 (12 nF for example), again optionally followed by capacitor 44/resistor 42 series. Signal comes out of impedance matching network 18 with communication signals, 180 out of phase, through a matching network through lines 22 running in parallel with lines 24/20, to which lines 22 are spliced at splices 26.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A method of configuring an electrical circuit comprising: selecting a length and gauge of power wire to achieve a targeted inductance based on an impedance of said circuit and a resistance of said circuit.

2. The method according to claim 1, wherein said targeted inductance is approximately 1 microhenry.

3. The method according to claim 1, according said impedance approximately 40 ohms.

4. The method according to claim 1, said resistance approximately 120 ohms.

* * * * *